United States Patent [19]
Shin et al.

[11] Patent Number: 5,548,431
[45] Date of Patent: Aug. 20, 1996

[54] BIDIRECTIONAL MULTI-CHANNEL OPTICAL RING NETWORK USING WDM TECHNIQUES

[75] Inventors: Jong-Dug Shin; Cheul-Shin Kang; El-Hang Lee, all of Daejeon, Rep. of Korea

[73] Assignee: Electronics & Telecommunications Research Inst., Daejeon, Rep. of Korea

[21] Appl. No.: 335,454

[22] Filed: Nov. 7, 1994

[30] Foreign Application Priority Data

May 14, 1994 [KR] Rep. of Korea .................. 94-10564

[51] Int. Cl.$^6$ .................. H04B 10/20; H04J 14/00
[52] U.S. Cl. .................. 359/119; 359/125; 359/137; 370/85.15
[58] Field of Search .................. 359/114, 119, 359/125, 127, 137, 166; 370/60.1, 85.15

[56] References Cited

U.S. PATENT DOCUMENTS 5,369,515 11/1994 Majima .................. 359/119
5,406,401 4/1995 Kremer .................. 359/119

OTHER PUBLICATIONS

Fortenberry, et al.: Optical Transparent Node For A Multiple-Bit-Rate Photonic Packet-Switched Local Area Network: Apr. 7-8, 1994, Proceedings of the EOS & SPIE, vol. 1974; EurOpts Series.

Primary Examiner—Leo Boudreau
Assistant Examiner—Kinfe-Michael Negash
Attorney, Agent, or Firm—Larson and Taylor

[57] ABSTRACT

A bidirectional multi-channel all-optical ring network is provided, this network comprising a number of nodes linked by optical cables, each of the node comprising two of WDM/WDDM, packet switching devices, and a node controller, in which network a first optical signal group of wavelength channel signals (for example, $\lambda_1, \lambda_3, \lambda_5, \ldots$) are transferred in a counter-clockwise direction, and a second optical signal group of wavelength channel signals (for example, $\lambda_2, \lambda_4, \lambda_6, \ldots$) are transferred in a clockwise direction, thereby allowing an optical data signal to be transmitted through the channel of shorter distance.

4 Claims, 2 Drawing Sheets

BIDIRECTIONAL MULTI-CHANNEL OPTICAL RING NETWORK USING WDM TECHNIQUES

BACKGROUND OF THE INVENTION

1. Field of Invention

This invention relates to a multichannel all-optical ring network, more particularly to a bidirectional multichannel optical ring network using WDM techniques.

2. Description of the Related Art

In present communication systems, all-optical networks receive a great deal of attention. The transmission capacity of future communication networks is anticipated to be dependent on which types of communications will be serviced. Many services which have large information data bases such as, three dimensional pictures and remote medical services are gradually becoming popular, and so a tremendous quantity of information is required to be communicated. In order to maximize the data transfer rate and through put of the network, various multiplexing techniques such as wavelength division multiplexing (WDM), optical frequency division multiplexing (OFDM), and optical time division multiplexing (OTDM) have been proposed. Optical switching and repeating devices have been developed for the optical processing in order to overcome electronic speed bottlenecks in the network.

In a similar effort, Rance M. Fortenberry et al, proposed an optically transparent node for use within a photonic LAN (Local Area Network) or MAN (Metropolitan Area Network), which has several advantages over an equivalent electronic network, including flexibility of data format and the ability to avoid electronic speed bottlenecks in their paper entitled "Optically transparent node for a multiple-bit-rate photonic Packet-switched local area network", OFC/IOOC '93 Technical Digest (1993), pp 21–23.

Since the introduction of optical devices and technology using a wide bandwidth of a single mode fiber for telecommunication applications, the study of the architecture and the protocol of all-optical networks have been a major concern. Among these, ring topology optical networks are of great interest.

Generally, an optical ring network is widely used in B-ISDN, local area networks (LAN's) and customer premise networks (CPN's). Such an network is known from the articles by N. Shimosaka et al. entitled "Wavelength-addressed Optical Network using an ATM cell-based access scheme", OFC/IOOC '93 Technical Digest (1993), pp 49–50; and by J. D. Shin et al. entitled "Photonic packet-switching device for WDM-based optical ring networks", SPIE, vol. 1974, pp 221–229.

In the J. D. Shin et al, the optical ring network consists of a number of nodes linked by optical ring cables. A source node transmits a cell or a packet to a destination node through the ring cables, the cell including an address field and an information content of a cell, i.e. a payload in turn, and the address field indicating the address of the destination node. When the cell is received by a node, if the received address field, i.e. a destination address doesn't match the node's own address, the node is regarded as an intermediate node between the source node and destination node, so that the node transmits the received cell to the following node through the ring cables. Otherwise, if the destination address matches the node's own address, the node is regarded as a destination node and stores the received cell in a receive buffer.

FIG. 1 shows a conventional multichannel all-optical ring network which has an all-optical packet switching device 50. In both FIG. 1 and FIG. 2, the circles represent nodes, the thicker connecting lines are optical connectors, and the thinner connecting lines are electrical connectors. When a node 70 receives a wavelength division multiplexed optical signal from a previous node or a source node ($N_1 \ldots N_n$) through the optical cables 3, the received optical signal is demultiplexed by WDDM (Wavelength Division Demultiplexer) 10a. Then, one of the demultiplexed signals (about 10% of the received optical signal) is transmitted to an optical fiber coupler 4.

The optical fiber coupler 4 receives and splits the signal transmitted by WDDM so as to supply it to a laser diode optical amplifier 9. An optical address processor 7 consists of an optical fiber delay line matched filter (not shown) and a threshold detector (not shown). When the output signal of the amplifier 9 is supplied to the optical fiber delay line matched filter, the filter generates corresponding correlation pulses depending upon the incoming address signal and the node address information stored in the filter.

Since a peak value of the auto-correlation pulse is always higher than that of the cross-correlation pulse, the threshold detector easily determines whether the address of the incoming cell matches the node's own address. If an address match is found, the optical fiber delay line matched filter transmits auto-correlation pulses to the threshold detector. If, however, the address match is not found, the filter transmits cross-correlation pulses to the threshold detector. Thus, according to whether the maximum value of the correlation pulses is larger than the threshold value or not, the threshold detector generates a digital control signal of the first level (e.g. a logic "1" state) or of the second level (e.g. a logic "0" state) to drive the gate pulse generator 1 which controls an optical switch 6.

In other words, when the digital control signal of the logic state "1" is generated by the detector (i.e. when the destination address of the incoming cell matches the present node's own address), the optical switch 6 transmits the incoming optical signal to the receiver of the present node. However, when the digital control signal of the logic state "0" is generated, the optical signal is bypassed to the laser diode optical amplifier 9 where the incoming optical signal is amplified. Then, the output signal of the amplifier 9 is transmitted to the WDM (Wavelength Division Multiplexer 10 through the optical fiber coupler 4 in order to be multiplexed with optical signals output by other channels. Thereafter, the resultant signal is transferred to the next node.

As described above, since the conventional optical ring network uses a unidirectional ring structure, even when a node transmits a signal to a neighboring node located on the opposite side of the transmission travelling from the first node, the signal must continue to travel in the same direction around the ring to reach the neighboring node on the other side. As a result, the signal propagation time between the source node and destination node is nearly equal to the time required for one complete circuit of the ring cable.

AN OBJECT AND SUMMARY OF THE INVENTION

It is an object of this invention to provide a hi-directional multichannel all-optical ring network which propagates signals of a first wavelength channel group (for example, $\lambda 1$, $\lambda 3$, $\lambda 5$, . . . ) of the optical signal in a counter-clockwise direction, and signals of a second wavelength channel group (for example, λ2, λ4, λ6, ...) of the same in a clockwise direction, thereby allowing a data signal to be transmitted through the channel of shorter distance. That is, the bidirectional multichannel optical ring network of this invention transmits a signal between the source node and destination node through the channel of shortest distance. As a result, signal propagation time can be reduced by half, the average transfer delay characteristic of the network is improved over that of the conventional network, and transmission capacity of the network, i.e. the performance of the network, is superior to that of the conventional network.

To achieve the above object, a bidirectional all-optical ring network comprising optical cables, where optical signals are transferred on the basis of a packet or a cell consisting of an address field and an payload, and a number of nodes linked by said optical cables, each of said nodes having a first and a second wavelength division multiplexer/demultiplexer (WDM/WDDM) means connected to said cables for dividing said optical signals into multi-channel signals and for combining multichannel signals into optical signals, a plurality of a pair of packet switching means, said a pair of packet switching means including a first and a second packet switching means coupled to said first and a second WDM/WDDM means for processing said optical signals, a node control means for controlling the transfer direction of said processed optical signals, wherein;

each of said packet switching means comprising an address processor for producing a trigger pulse depending upon an address match of said address field with an address assigned to that node, an optical switching means for selectively transferring said optical signals in response to said trigger pulse, and a delay line coupled parallel to said address processor for providing an appropriate delay in the optical so that said optical switching means can be correctly configured before the packet of optical signals arrives at the input of the optical switching means, the improvement wherein ; said transfer direction which is controlled by said node control means is bidirectional.

BRIEF DESCRIPTION OF THE DRAWINGS

To better understand the invention and to show how the same may be carried into effect, reference will now be made, by way of example, to the accompanying drawings, in which.

DESCRIPTION OF THE PREFERRED EMBODIMENT

Figure 1:
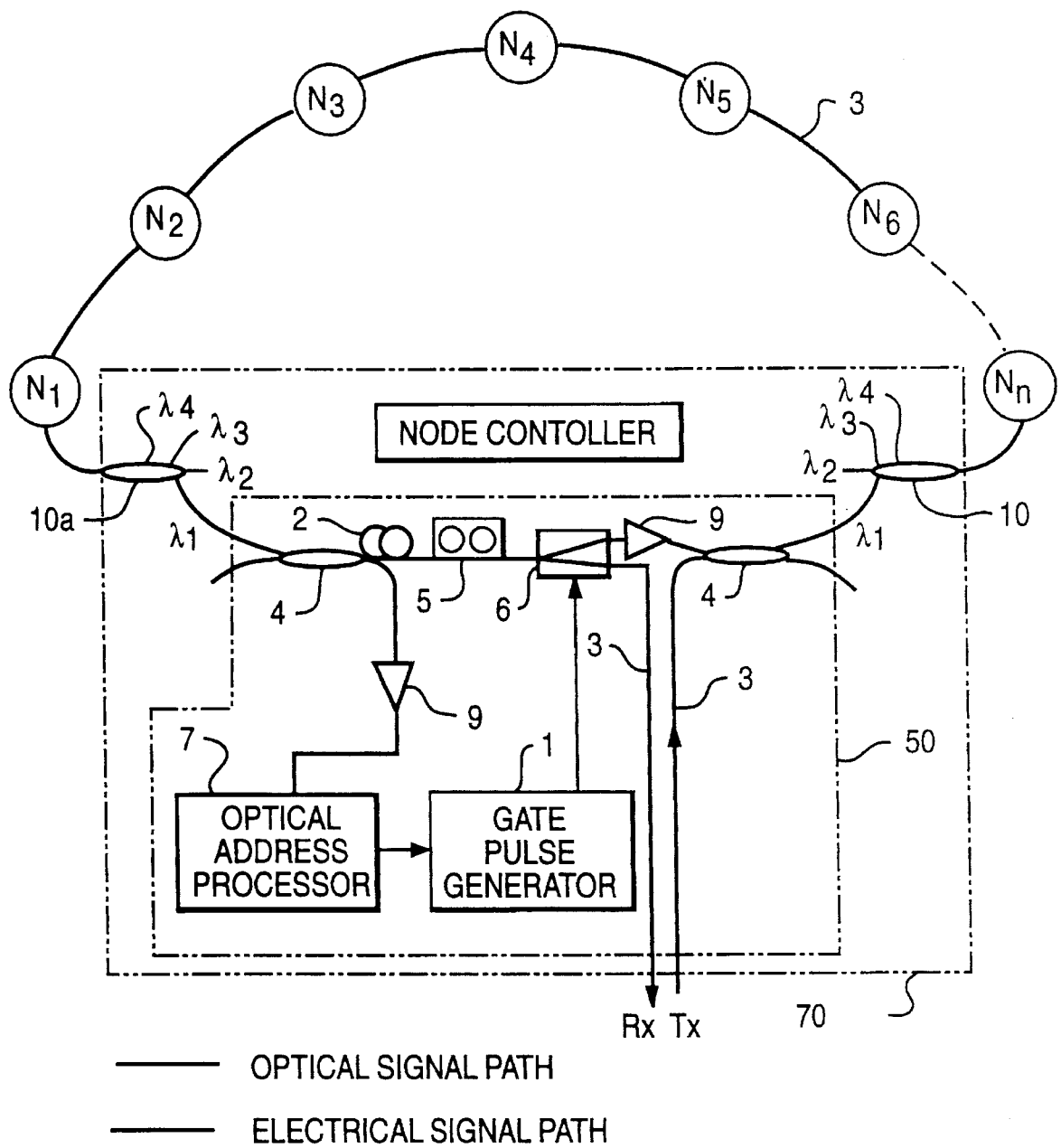
FIG. 1 is a block diagram showing a conventional unidirectional multichannel all-optical ring network using an all-optical packet switching device.
Figure 2:
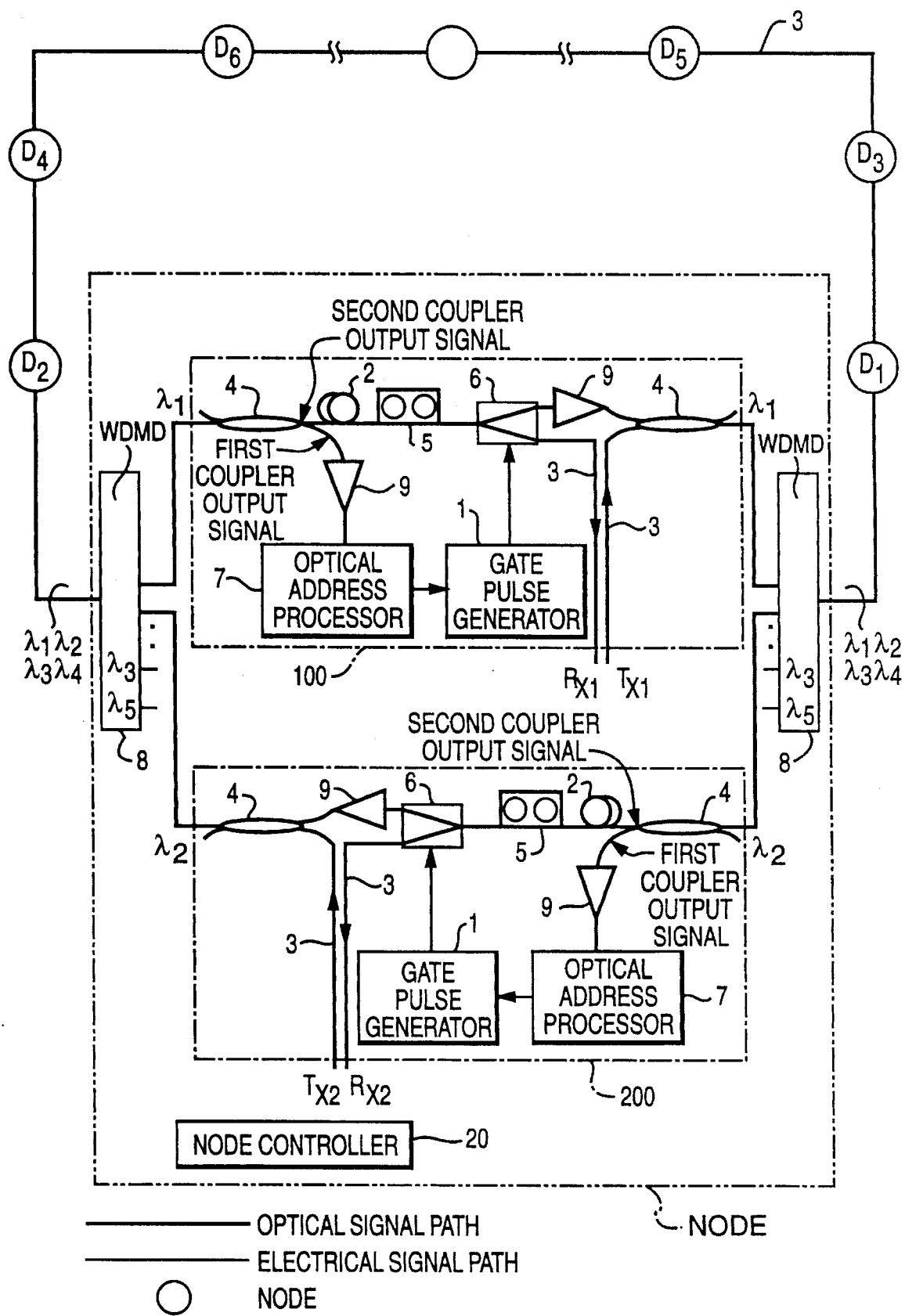
FIG. 2 is a block diagram showing a bidirectional multichannel optical ring network using WDM techniques according to the present invention.

FIG. 2 shows an optical ring network of the present invention, which has a plurality of nodes linked by an optical ring cable 3. A first signal group, which consists of wavelength channel optical signals (1, 3, 5 6) is transmitted in a counter-clockwise direction, while a second signal group, which consists of wavelength channel optical signals (2, 4, 6 6), is transmitted in a clockwise direction along the optical ring cable 3.

When the optical signal transmitted through the optical ring cable 3 is received in a node 300, it is demultiplexed at the wavelength division multiplexer/demultiplexer 8 to a plurality of optical wavelength signals which have different wavelength values respectively. Thereafter, each of the optical wavelength signals is respectively received by a corresponding channel in the optical packet switching device 100. As an aspect of the invention, consider the case that an optical signal of wavelength 1 is received in the optical packet switching device 100.

An optical fiber coupler 4 of the optical packet switching device 100 receives the optical wavelength signal, i.e. the optical packet signal, and splits into a first and a second coupler output signals. At this time, the first coupler output signal has one part of the power of the optical packet signal received by the coupler 4 while the second coupler output signal has the remaining power of the signal. The first coupler output signal used to process an optical packet address is transmitted to a laser diode optical amplifier 9 where it is amplified so as to cause an optical address processor 7 to process the signals.

The optical address processor 7 consists of an optical fiber delay line matched filter (not shown) and a threshold detector (not shown). When the output signal of the amplifier 9 used in the photonic packet switching devices is input to the optical fiber delay line matched filter, the filter outputs corresponding correlation pulses depending upon the incoming address signal and the node address information stored in the filter. Since a peak value of the autocorrelation pulse is always higher than that of the crosscorrelation pulse, the threshold detector easily determines whether the address of the input optical data cell matches the specific node address stored in the filter.

If an address match is found, the optical fiber delay line matched filter transmits autocorrelation pulses to the threshold detector. If, however, an address match is not found, the filter transmits crosscorrelation pulses to the threshold detector. Thus, according to whether the maximum value of the correlation pulses is larger than the threshold value or not, the threshold detector generates a digital control signal of the first level (for example, a logic "1" state) or of the second level (for example, a logic "0" state) to drive the gate pulse generator 1 which controls an optical switch 6.

In other words, when the digital control signal of the logic state "1" is generated by the detector (i.e. when the destination address of the incoming cell matches the present node's own address ), the optical switch 6 transmits the incoming optical signal to the receiver of the present node. However, when the digital control signal of the logic state "0" is generated, since this means that node is not the destination node, the optical signal is bypassed to the laser diode optical amplifier 9 where the incoming signal is amplified. Then, the output signal of the amplifier 9 is transmitted to the wavelength division multiplexer/demultiplexer 8 through the optical fiber coupler 4 so that it may be multiplexed with optical signals output by other channels. And then, the resultant signal is transmitted to the next node.

On the other hand, an optical fiber delay line 2 compensates the payload with delay time required for processing the packet address along the digital control signal transmission path, which transmission path consists of the laser diode optical amplifier 9, the optical address processor 7 and the gate pulse generator 1. Thereafter, when the optical switch 6 is in an "on" state, the payload of the packet can be simultaneously switched by the optical switch 6.

A polarization controller 5 coupled between the optical fiber delay line 2 and the optical switch 6, serves to minimize the optical loss by regulating the polarized light of input signal to the polarization axes of the optical switch 6 and the optical amplifier 9.

As described in the beginning, the second signal group transmitted in a clockwise direction may also be received in a node through the optical cable 3. When the optical signal transmitted through the optical ring cable 3 is received in a node, it is demultiplexed at the wavelength division multiplexer/demultiplexer 8 to a plurality of optical wavelength signals which have different wavelength values respectively. Thereafter, each of the optical wavelength signals is respectively received by a corresponding channel in the optical packet switching device 200.

As a further aspect of the present invention, consider the case that the optical wavelength signal of wavelength 2 is received in the optical packet switching device 200.

An optical fiber coupler 4 of the optical packet switching device 200 receives the optical wavelength signal, i.e. the optical packet signal, which splits into a first and a second coupler output signals. Since a further processing procedures of the first and the second coupler output signals in the optical switching device 200 are identical to the processing procedures of the same signal in the optical packet switching device 100, a more, detailed description will be here omitted.

If a node wishes to transmit data, the node does so through an empty-slot which is produced by the node's receiving packet data of the slot, or through an empty-slot which is produced by the other node's receiving the same. At this time, packet data to be loaded in an empty-slot is transmitted in the direction of least distance of the counterclockwise and clockwise directions by means of the node controller 20. In FIG. 2, first and second optical transmitters $T_{x1}$ and $T_{x2}$ and first and second optical receivers $R_{x1}$ and $R_{x2}$ all are connected to the node controller 20. The node controller 20 has the information retaining to transmission distance of respective nodes. By using the information, the node controller 20 can control the transfer direction of the processed signals. That is, when data is transmitted in a clockwise direction, the data is loaded in an empty-slot of channel wavelength 2. Otherwise, data is loaded in an empty-slot of channel wavelength 1.

As a result, according to the bidirectional multichannel optical ring network of the present invention, signal propagation time can be reduced by half, the average transfer delay characteristic of the network is improved over that of the conventional network, and transmission through put of the network, i.e. the performance of the network, is superior to that of the conventional network.

Although aspects of the invention have been described above, it will be apparent that many modification and variations could be effected therein by one skilled in the art without departing from the spirit or scope of the invention as defined by the appended claims.

What we claim is:

1. A bidirectional all-optical ring network comprising optical cables and a number of nodes linked by said optical cables, whereby optical signals are transferred on the basis of a packet or a cell which is comprised of an address field and a payload, a cell being a fixed size packet, each of said nodes having a first and a second port which are connected to a corresponding port in a next adjacent node, each node including a first and a second wavelength division multiplexer/demultiplexer (WDM/WDDM) means respectively located at said first and said second ports, said WDM/WDDM means connected to said cables for combining a number of multichannel optical signals into a multiplexed optical signal and for dividing said multiplexed optical signal into a number of multichannel optical signals; and a pair of packet switching means coupled to said first and second WDM/WDDM means for processing said optical signals, each of said packet switching means comprising:
an address processor for producing a trigger pulse depending upon an address match of said address field with an address assigned to that node,
an optical switch for selectively transferring said demultiplexed optical signal in response to said trigger pulse, and
a delay line coupled in parallel to said address processor for providing an appropriate delay in the optical path so that said optical switch can be timely operated before the packet of optical signals arrives at the input port of the optical switch.

2. A bidirectional all-optical ring network as claimed in claim 1, in which said multichannel signals are divided into a first signal group and a second signal group, respectively, and each channel in said first signal group and said second signal group is different in its wavelength.

3. A bidirectional all-optical ring network as claimed in claim 2, in which said address processor comprises:

a filter means for producing corresponding correlation pulses depending upon the destination address signal and a node address information stored therein; and a means for producing a first level digital signal when the maximum of said output pulses of the filter means is greater than a threshold value which is stored in this means, or producing a second level digital signal when the maximum of said output pulses of the filter means is smaller than said threshold value.

4. A bidirectional all-optical ring network as claimed in claim 1, in which said address processor comprises:

a filter means for producing corresponding correlation pulses depending upon the destination address signal and a node address information stored wherein;

a means for producing a first level digital signal when the maximum of said output pulses of the filter means is greater than a threshold value which is stored in this means, or producing a second level digital signal when the maximum of said output pulses of the filter means is smaller than said threshold value.

\* \* \* \* \*